United States Patent [19]

Salo

[11] Patent Number: 4,593,215
[45] Date of Patent: Jun. 3, 1986

[54] ELECTROMAGNETIC DRIVE FOR SHAFTLESS ROTARY DEVICES

[76] Inventor: Eric A. Salo, 15898 Via Pinale, San Lorenzo, Calif. 94580

[21] Appl. No.: 152,587

[22] Filed: May 23, 1980

Related U.S. Application Data

[63] Continuation of Ser. No. 921,463, Jul. 3, 1978, abandoned.

[51] Int. Cl.⁴ .................................................. H02K 33/00
[52] U.S. Cl. ....................................... 310/36; 310/166
[58] Field of Search ...................................... 310/26–39, 310/166, 198–207

[56] References Cited

U.S. PATENT DOCUMENTS 3,130,591  4/1964  Paddick et al. .................. 310/36 X Primary Examiner—Donovan F. Duggan
Attorney, Agent, or Firm—Frank A. Neal

[57] ABSTRACT

Rotary devices comprising rotor and stator elements are provided with rotational energy by an adaptation of the principle of the polyphase induction motor. Divided stator windings are provided to enable the rotary device to induce essential currents in the rotor windings without the production of undesirable and destructive currents in the rotary element proper.

4 Claims, 6 Drawing Figures

4,593,215

ELECTROMAGNETIC DRIVE FOR SHAFTLESS ROTARY DEVICES

CROSS-REFERENCE TO RELATED APPLICATION

This application is a continuation of my co-pending application, Ser. No. 921,463, filed July 3, 1978, now abandoned for Electromagnetic Drive for Shaftless Rotary Devices.

SUMMARY OF THE INVENTION

The subject invention is an electro-mechanical drive system which provides the rotational drive of the conventional polyphase electric induction motor for the operation of rotary devices.

The rotary device, a pressure equalizing pump, utilizes a rotor for mechanical pumping and for imparting rotational energy in the manner of the rotor of a polyphase induction motor. The seal discs of the pump travel through the revolving magnetic fields generated by the drive stator. Since the rotor revoles at the slip speed of the induction motor the seal discs of the pump are subject to the revolving field imposed by the stator windings. Undesirable currents are thereby induced in the discs.

The problem of minimizing the parasitic induced currents in the seal discs is solved by providing two side by side stator and rotor circuits. The companion stator windings are wound to impose similar revolving fields for the rotors. The stator windings are angularly offset to provide polarities in the lateral sense to the two companion windings. This can be visualized as two side by side stator windings rotationally offset through an angle corresponding to the stator pole pitch. The result is that a transverse conducting element of a rotor, such as a seal disc, is subject to stator induced revolving fields which are of reverse polarity. As a consequence the induced electromotive force from one stator field is in opposition to the electromotive force from the companion stator field and the net induced current in the sealing disc is essentially zero.

In reference to the conducting bars of the rotor that compose the rotor windings of the induction motor portion of each of the companion rotors, these are electrically connected a pole pitch apart peripherally. The result is that the induced electromotive forces are made additive by connecting the rotor conductors in series to make them additive, that is, a pole apart in rotational position. The result is that the companion rotors act in concert to produce motor torque to energize the device and produce pumping power.

In summary, the seal discs rotate past opposed polarity magnetic fields and generated opposed emf's that cancel each other. The rotor conduction bars rotate past magnetic fields of like polarity and generate unidirectional dditive emf's which generate rotor magnetic fields which are driven by the revolving fields of the stator windings to impose torque on the rotor structure and provide pumping power.

An object of the invention is to provide in a polyphase induction motor a pair of stator windings which are connected to each other in series but which provide side by side magnetic polarities which are reversed, whereby conductor elements carried by the rotor will cut magnetic flux lines of opposite direction to thereby receive induced voltages which are in opposition and balance each other out.

A further object of the invention is to provide a polyphase induction motor type of electrical drive system for rotary devices while elminating or minimizing the induction of electromagnetic forces in conductor elements carried by the rotor to thereby prevent the induction of stray currents in such rotary devices.

RELATED PATENT

In my U.S. Pat. No. 3,930,757 there is shown a pressure equalizing pump of the shaftless rotary device type. It embodies a mechanical drive for the rotor. The present invention enables the mechanical drive shown in the patent to be replaced with an electromagnetic drive without any consequent production in the pressure equalizing pump of undesired induced electromagnetic forces and currents. That is, however, only one example of the fields of use of the present invention.

The foregoing as well as other objects and advantages of the invention will be apparent from the following description taken in conjunction with the drawings forming part of this specification and in which.

The drawings show a pressure equalizing pump like that shown in U.S. Pat. No. 3,930,757, but modified to have the electromagnetic drive of the present invention rather than the mechanical drive shown in the patent.

Figure 2A:
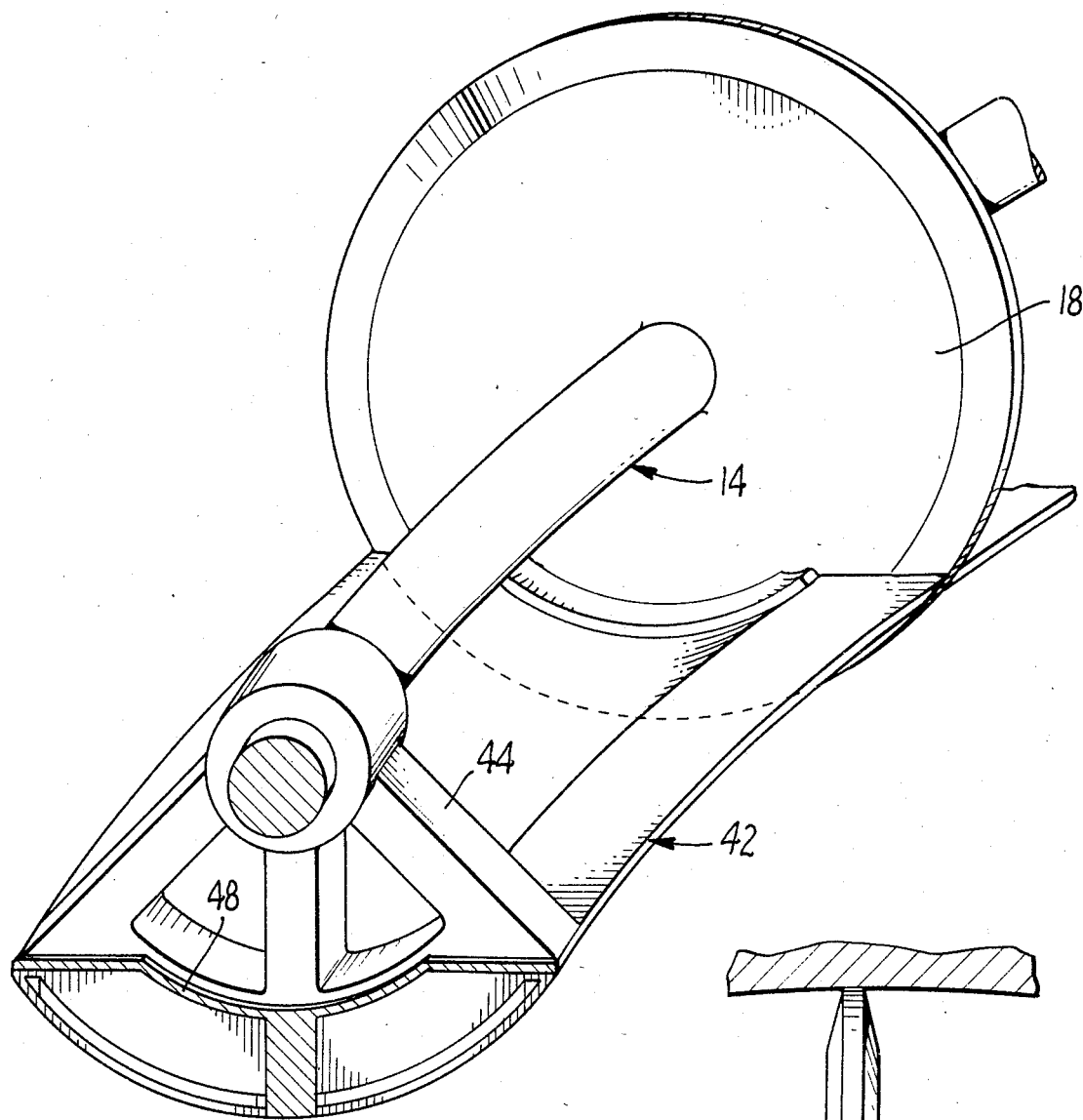
FIG. 2A is a partial view in perspective of the rotor assembly of the pump of FIG. 1.
Figure 2B:
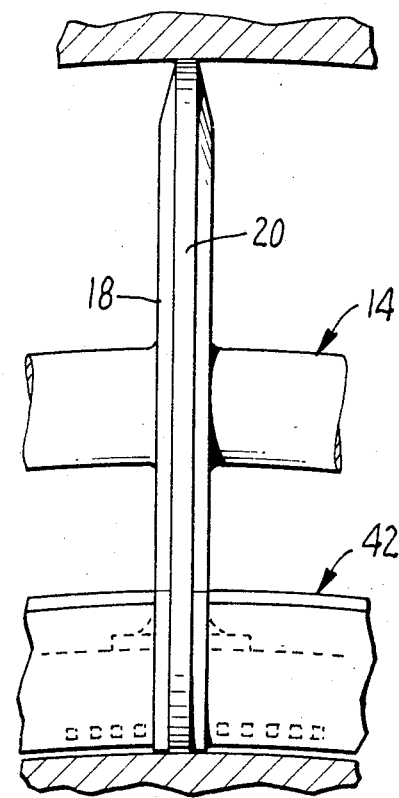
FIG. 2B is a detail view, partly in side elevation and partly in section, of the rotor assembly of FIG. 2A.

The pump comprises a toroidal casing 10 having defined therein a toroidal chamber 12. A transparent ring indicated generally at 14 is provided with sealing discs 18 which are provided with expansible sealing rings 20 (FIG. 2B). The discs 18 and rings 20 divide the chamber 12 into a continuous series of volumetric pumping chambers.

The pump is provided with a filling station 26 with which the volumetric chambers communicate as indicated by the flow arrows 27. For example, the filling station or feed chamber 26 may be supplied with feed water which is to be brought up to pressure by passage through the pump and then delivered by the pump to the feed water inlet of a steam boiler.

Figure 1:
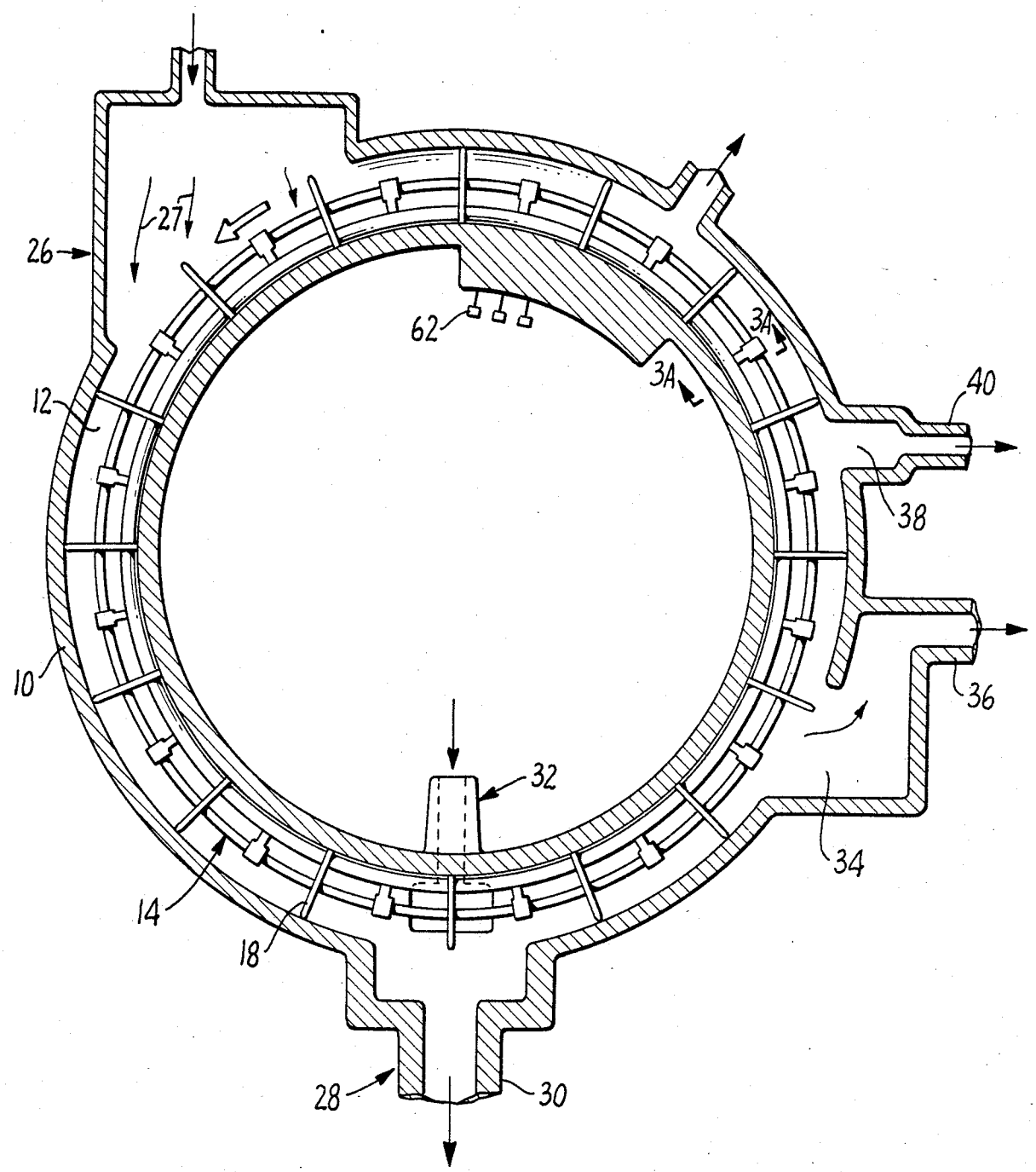
FIG. 1 is a view of the overall pump of the aforementioned patent modified to embody the electromagnetic drive of the present invention.

Counter-clockwise rotation of the transport ring in FIG. 1 moves the volumetric chambers from the filling station 26 to the discharge station 28 which is provided with discharge conduit 30. The liquid content of the volumetric chamber or chambers in communication with the discharge conduit 30 is brought up to pump discharge pressure by fluid pressure applied to the volumetric chamber or chambers through conduit 32. The pressure medium applied through conduit 32 may, for example, be steam from the previously mentioned steam boiler. This steam is therefore effective to bring the feed water up to pressure and feed it into the feed water side of the steam boiler. Such a pump as this is capable of high speed operation, and the pumped liquid will therefore be discharged through conduit 30 under the combined effect of the pressure medium applied through conduit 32 and the centrifugal force caused by the rotation of the transport ring 14.

Further rotation of the transport ring 14 brings the volumetric chambers into communication through port 34 and discharge conduit 36 with a suitable manifold system, not shown, for the discharge from the volumetric chambers and recovery of the high pressure gas within the volumetric chambers.

Further rotation of the ring 14 brings the chambers into communication through port 38 with another manifold recovery system comprising conduit 40. The residual low pressure gas is thus discharged from the ring chambers.

Various features and advantages of such a pump are described in U.S. Pat. No. 3,930,757 at column 2, lines 15-55.

Figure 3A:
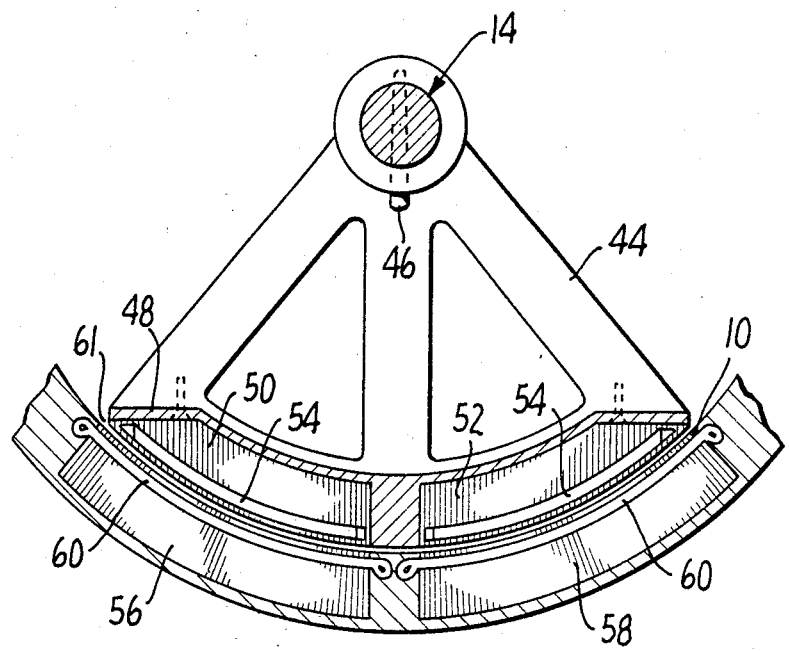
FIG. 3A is an enlarged view taken along lines 3A—3A of FIG. 1.
Figure 3B:
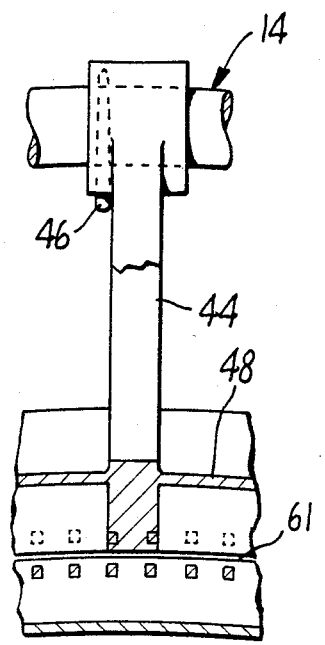
FIG. 3B is a view in side elevation of what is shown in FIG. 3A.

An annular electromagnetic rotor indicated generally at 42 (FIG. 2A) is attached to and carried by the transport ring 14 by means comprising web members 44 which are sleeved on ring 14 and secured thereto, as by tapered lock pins 46 (FIG. 3A). The rotor 42 comprises a carrier 48 which carries a first magnetic rotor core 50 and a second magnetic rotor core 52. These cores are provided with windings 54.

Attached to the pump casing 10 (FIG. 3A) is a stator having first and second magnetic stator cores 56 and 58 which are provided with windings 60. An air gap 61 is provided between the rotor and the stator. The stator is provided with three phase power terminals 62.

The stator windings 60 are in electromagnetic register with the rotor core and windings. The stator winding is of adequate arc angle to provide a multiplicity of magnetic instantaneous poles along the arc of rotor travel needed to supply driving torque to rotate the rotor and to accelerate the fluid being pumped to the required velocity to attain a hydraulic energy output adequate to obtain the desired pump output.

As shown in FIG. 2B, the rotor is attached to and carried by both the web members 44 and the sealing discs 18.

Figure 4:
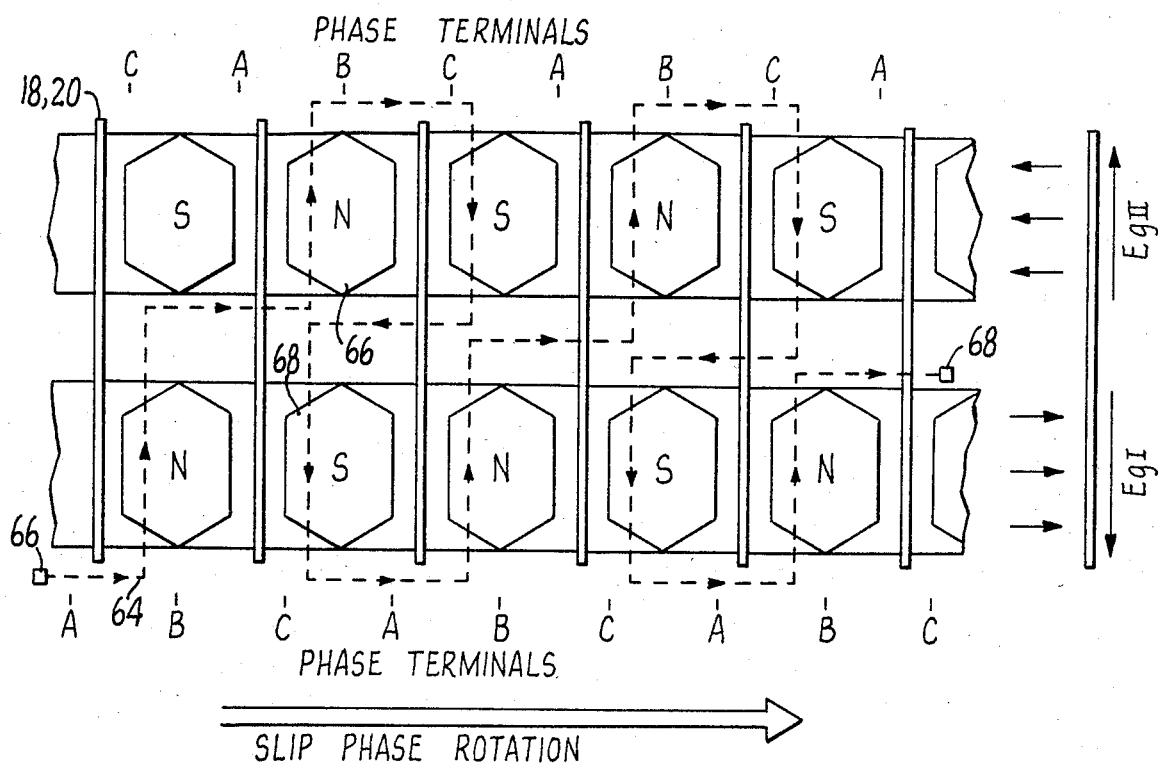
FIG. 4 is a semi-schematic view of the stator winding, as exemplified by a single conductor which follows the path shown by the broken line.

FIG. 4 shows a developed, partial layout of the stator windings 60 for the stator cores 56 and 58. A single conductor is traced by the broken line 64 from a terminal 66 to a terminal 68. This is illustrative of all of the stator conductors and shows that the windings 60 for the two stator cores operate with the same current since the conductors are in series from core to core for the two separate core and winding systems. Also, the magnetic polarities are reversed between the two windings 60, as indicated by the apposition of north poles 70 and south poles 72 for any given angular position of rotor. This is also shown or further indicated by the positions in FIG. 4 of the sealing discs and rings 18, 20. Since the sealing discs and rings move at the same speed and in the same direction as the rotor but under magnetic flux of opposite direction, the induced voltages therein are in opposition and are equal, thus cancelling out to a net zero current in each sealing disc and ring inasmuch as they are subject to the rotor inductive effect of the slip frequency of the rotor circuits. This elimination of minimization of induced electromagnetic forces in the sealing discs and rings prevents the setting up of stray currents of undesirable and possible destructive nature therein. The provision of stator windings with the configuration of FIG. 4 enables the induction of the essential currents in the rotor windings without the side production of unwanted currents in any conductor portions of the rotary element of the rotary device.

What is claimed is:

1. For a shaftless rotary device comprising a housing, a chamber therein, and a rotary element carried within said chamber for rotational movement about a central axis of said rotary element, an electromagnetic drive for said device comprising a pair of axially spaced magnetic rotor cores carried by said rotary element and extending around said rotary element, windings for said rotor cores, a pair of axially spaced magnetic stator cores carried by said housing, windings for said stator cores, said stator cores and windings being in closely adjacent relation to said rotor cores and rotor core windings and being in electromagnetic register therewith, said stator core windings comprising conductors which extend continuously in series connected relation from one stator core to the other, said conductors having a winding configuration such that at axially aligned positions the stator windings have reversed magnetic polarity, whereby conductor elements extending axially of said rotary element and carried thereby will have induced therein opposing voltages tending to produce net zero stray currents.

2. Pumping apparatus comprising a casing, a toroidal chamber defined by a surface within the casing, said chamber having angularly spaced inlet and outlet openings, a ring of reduced transverse cross-section disposed within the chamber, spaced discs on the ring, expansible rings carried by the discs and disposed in engagement with said surface, said discs and rings dividing said chamber into a plurality of separate compartments, and means to rotatably drive said ring around said chamber comprising a pair of axially spaced magnetic rotor cores carried by said ring and extending around said ring, windings for said rotor cores, a pair of axially spaced magnetic stator cores carried by said housing, windings for said stator cores, said stator cores and windings being in closely adjacent relation to said rotor cores and rotor core windings and being in electromagnetic register therewith, said stator core windings comprising conductors which extend continuously in series connected relation from one stator core to the other, said conductors having a winding configuration such that at axially aligned positions the stator windings have reversed magnetic polarity, whereby said discs and expansible rings which are formed of conductor material will have induced therein opposing voltages tending to produce therein net zero stray currents.

3. A method for inhibiting the production of stray currents in conductor disc elements radially carried by the annular rotor of a rotary device operable as a polyphase induction motor comprising producing magnetic flux of equal and opposite direction in the space traversed by said disc elements upon rotation of said rotor, and moving said elements through said space to induce equal and opposite voltages in equal areal portions of said elements and to thereby produce net zero currents therein.

4. For a shaftless rotary device comprising a housing, a chamber therein, and a rotary element carried within said chamber for rotational movement about a central axis of said rotary element, an electromagnetic drive for said device comprising a pair of axially spaced magnetic rotor cores carried by said rotary element and extending around said rotary element, said respective rotor cores having windings electrically connected a pole pitch apart peripherally, a pair of axially spaced magnetic stator cores crried by said housing, said respective stator cores having windings rotationally offset through an angle corresponding to the stator pole pitch, said stator cores and windings being in closely adjacent relation to said rotor cores and rotor core windings and being in electromagnetic register therewith, said stator core windings comprising conductors which extend continuously in series connected relation from one stator core to the other, said conductors having a winding configuration such that at axially aligned positions the stator windings have reversed magnetic polarity, whereby conductor elements extending axially of said rotary element and carried thereby will have induced therein opposing voltages tending to produce net zero stray currents.

* * * * *